United States Patent [19] [11] 4,348,144
Nelson [45] Sep. 7, 1982

[54] METHOD AND APPARATUS FOR LOADING A MULTI-PLATEN PRESS

[76] Inventor: Victor R. Nelson, 2700 SW. Summit Dr., Oswego, Oreg. 97034

[21] Appl. No.: 163,813

[22] Filed: Jun. 27, 1980

[51] Int. Cl.³ .......... B65G 1/06

[52] U.S. Cl. .......... 414/277; 414/28; 414/786; 100/196

[58] Field of Search .......... 100/196, 193; 414/267, 414/277, 280, 786, 28, 35, 36

[56] References Cited

U.S. PATENT DOCUMENTS

| | | | |
|---|---|---|---|
| 3,398,844 | 8/1968 | Carlsson et al. | 414/277 |
| 3,799,366 | 3/1974 | Omelchuk | 414/277 |
| 3,908,527 | 9/1975 | Brockmüller et al. | 414/35 |
| 4,178,118 | 12/1979 | Bailey | 414/28 |
| 4,242,023 | 12/1980 | Mohrsen | 414/267 |

*Primary Examiner*—H. Grant Skaggs
*Attorney, Agent, or Firm*—Oliver D. Olson

[57] ABSTRACT

A plurality of pre-pressed plywood veneer assemblies are inserted one at a time onto separate trays mounted in vertically spaced apart relation on a carriage movable toward and away from a hot press, the forward movement of the assemblies on the trays being restricted by stops mounted in fixed relation to the hot press adjacent the infeed end thereof and movable between an extended position for intercepting the assemblies and a retracted position for allowing the assemblies to be moved into the hot press. Sweep arms on the rearward end of the carriage are movable into abutment with the rearward ends of the assemblies for moving them forwardly against the stops for aligning the front and rear ends of the assemblies vertically. Positioning arms mounted in fixed relation to the hot press adjacent the infeed end thereof are movable first to a squaring position for abutting the opposite sides of the assemblies for aligning their lateral sides vertically. When the assemblies have been squared on the trays by abutment of the stops and positioning arms, the stops and positioning arms are retracted and the carriage is moved forwardly with the sweep arms to move the trays and supported assemblies into the corresponding spaces between the press platens of the open hot press. The positioning arms then are moved to a stripping position for abutting the rearward ends of the assemblies in the hot press, for stripping the assemblies from the trays as the latter are withdrawn from the hot press by retraction of the carriage.

13 Claims, 11 Drawing Figures

METHOD AND APPARATUS FOR LOADING A MULTI-PLATEN PRESS

BACKGROUND OF THE INVENTION

This invention relates to the pressing of plywood veneer assemblies and like panel structures in multi-platen presses, and more particularly to method and apparatus for loading a plurality of plywood veneer assemblies in prepressed condition into a multi-platen hot press.

The loading of multi-platen hot presses heretofore has been accomplished by method and apparatus such as are described in U.S. Pat. No. 3,799,366. A plurality of pre-pressed plywood veneer assemblies are deposited one onto each of a plurality of vertically spaced trays supported by a carriage movable toward and away from the hot press. Rear arms then are swung inwardly behind the assemblies and the carriage moved rearwardly, away from the hot press, to bring all of the assemblies into abutment with the arms. The vertically aligned assemblies then are moved into the hot press by moving the carriage forwardly, after which stripper arms are extended inwardly behind the assemblies to retain the latter in the hot press while the carriage trays are retracted from the press. The stripper arms then are retracted and the press closed to effect hot pressing of the assemblies.

In U.S. Pat. No. 2,728,468 a plurality of assemblies to be pressed are deposited one onto each of a plurality of vertically spaced trays supported by a carriage movable toward and away from a press, the assemblies being positioned on the trays manually in vertically aligned condition after which the carriage is moved forwardly to bring the trays and assemblies into the hot press. Stripper bars then are moved in behind the assemblies to retain the latter in the hot press while the carriage trays are retracted from the press.

SUMMARY OF THE INVENTION

In its basic concept, the press loader of this invention provides for the vertical alignment of a plurality of panels on a plurality of vertically spaced trays on a carriage without movement of the carriage and the positive delivery of the aligned panels to a multi-platen press by movement of the carriage in a single forward motion.

It is by virtue of the foregoing basic concept that the principal objective of this invention is achieved; namely, to minimize the motions and therefore the time and power requirements for loading a multi-platen press with plywood veneer and other assemblies to be pressed.

Another object of this invention is the provision of method and apparatus of the class described by which plywood veneer and other panels are moved into a multi-platen press under positive confinement, whereby to insure accurate placement within the press.

Still another object of this invention is to provide method and apparatus of the class described by which a plurality of panels may be supported upon each tray, adjusted to common vertical alignment and delivered positively to a space of a multi-platen press.

The foregoing and other objects and advantages of this invention will appear from the following detailed description, taken in connection with the accompanying drawings of preferred embodiments.

BRIEF DESCRIPTION OF THE DRAWINGS

FIG. 10 showing the positioning mechanism adjusted for aligning the lateral sides of panels vertically; and FIG. 11 showing the positioning mechanism adjusted for stripping the panels from the trays.

DESCRIPTION OF THE PREFERRED EMBODIMENTS

Figure 1:
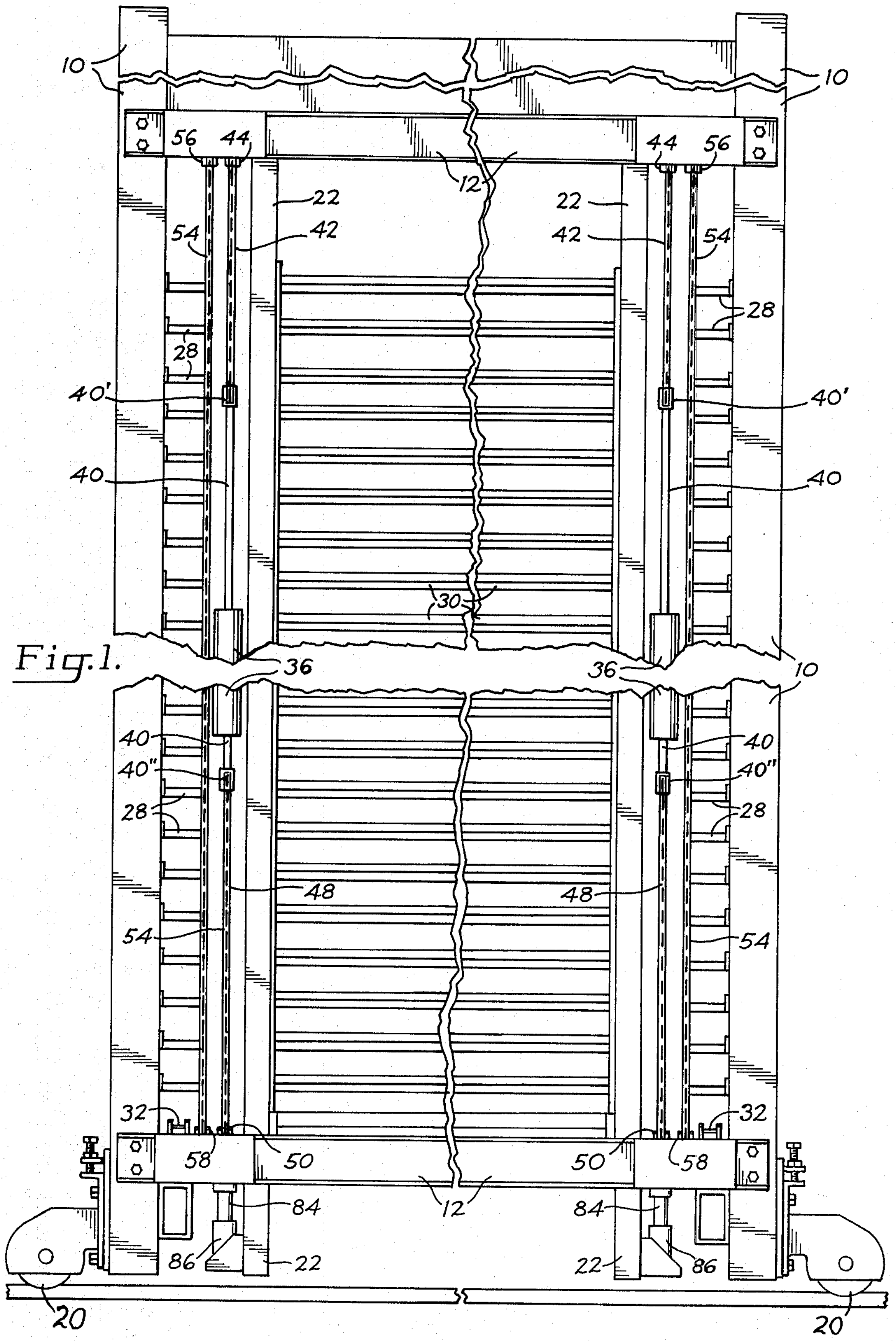
FIG. 1 is a foreshortened vertical elevation of the infeed end of press loading apparatus embodying the features of this invention.

Although the loading method and apparatus of this invention has particular utility in loading pre-pressed plywood veneer assemblies into a hot press for final consolidation, it is intended to apply to the loading of other multiple or single panel structures such as veneers, particle board panels, and others into hot or cold multi-platen presses for drying, consolidation, or other treatments.

The press loading apparatus includes a main frame formed of four vertical corner beams 10 interconnected by horizontal upper and lower transverse beams 12 and upper and lower longitudinal side beams 14. In the embodiment of FIGS. 1–7, the main frame is mounted adjacent the infeed end of a multi-platen press, illustrated in FIG. 2 by the broken representations of the vertically spaced apart press platens 16. In this respect, the end of the main frame closely adjacent the press is considered to be the outfeed end of the main frame. The main frame is supported upon rails 18 which extend transversely across the front, or infeed end of the press, by rail wheels 20 secured to the bottom ends of the corner beams. It is by this means that the main frame and the remaining components supported by it, may be moved laterally away from the multi-platen press for maintenance and repair.

Figure 2:
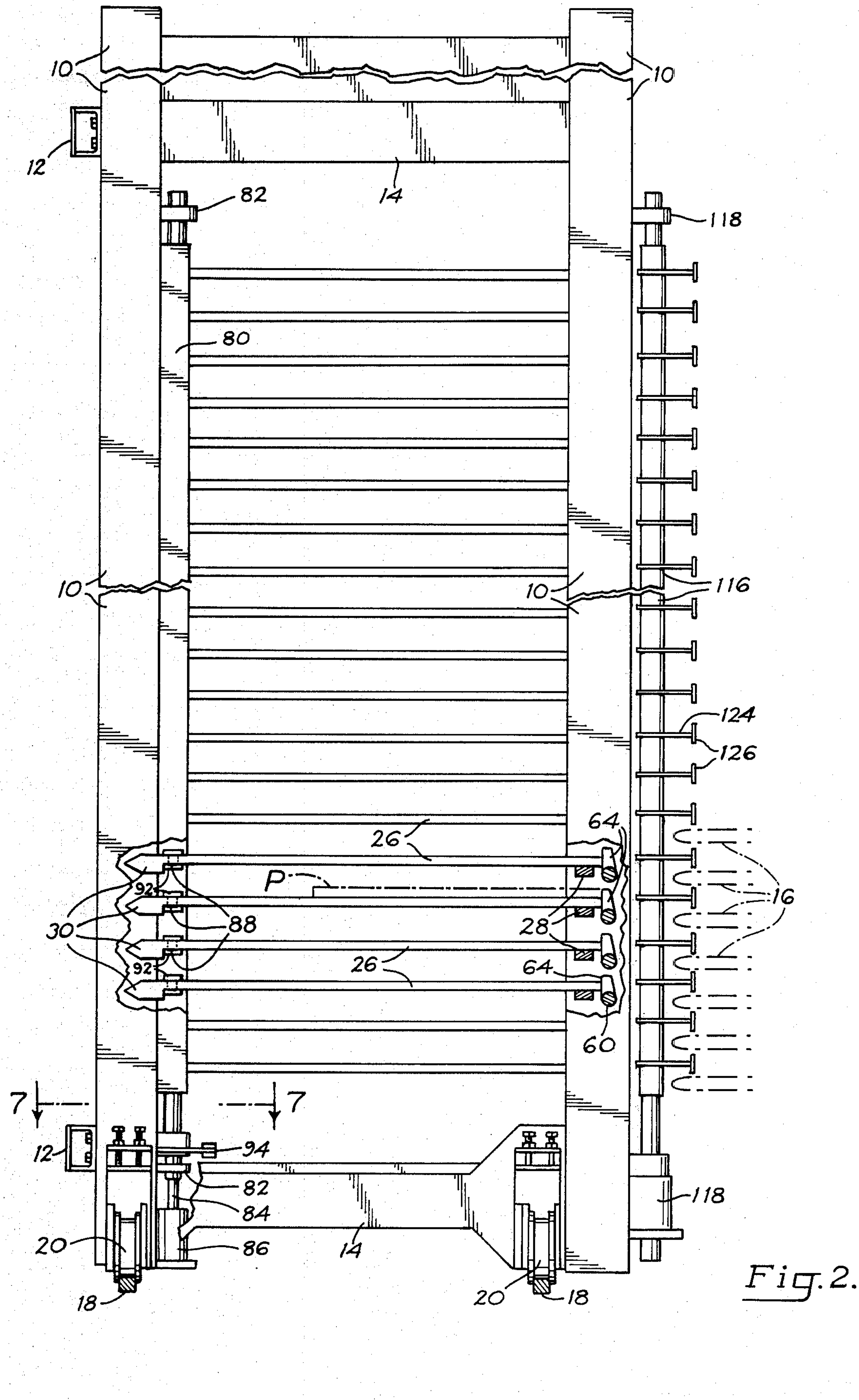
FIG. 2 is a foreshortened side elevation as viewed from the right in FIG. 1, the loading apparatus being shown in association with a portion of a multi-platen press illustrated in broken lines.

Mounted within the main frame is a tray carriage. It is formed of a pair of laterally spaced, vertical beams 22 interconnected by top and bottom transverse beams 24. Secured between the vertical beams of the carriage are a plurality of vertically spaced trays 26. In the embodiment illustrated and best shown in FIG. 3, each tray is formed of an open network of square tubings, the rearward transverse tubing 26' being secured at its opposite ends to the vertical beams of the carriage. The vertical spacing between adjacent trays corresponds to the vertical spacing between adjacent press platens 16 when the multi-platen press is open (FIG. 2). The forward end of each tray is supported slidably by a transverse bar 28 which extends between and is secured at its opposite ends to the forward corner beams 10 of the main frame.

The rearward, or infeed end of each tray is provided with an enlarged guide head 30 secured to the tubing 26'. It tapers rearwardly to V-shape to provide an enlarged entrance opening between adjacent trays, to facilitate the insertion of pre-pressed plywood veneer assemblies or other types and forms of panels P onto the trays. As is well known, this infeed of panels is provided by power driven feed rolls mounted on a vertically movable elevator upon which a stack of panels is deposited and from which an operator moves the upper panel of the stack into the feed rolls for delivery to each tray as the elevator is indexed vertically into alignment with each successive tray.

The bottom end of the carriage mounts and is supported upon rail wheels 32 which roll on tracks 34 secured to the main frame. The tracks extend longitudinally in the direction of the infeed and outfeed ends of the main frame. The carriage is mounted on the main frame for movement between a retracted position (FIGS. 2, 3 and 4) for introducing panels onto the trays, and an extended position wherein the trays project forwardly beyond the outfeed end of the main frame and into the spaces between the platens 16 of the open multi-platen press. Although this movement of the carriage may be provided by a variety of mechanisms, the simplified mechanism illustrated in FIGS. 4 and 5 is preferred.

Thus, secured to each of the laterally spaced vertical beams 22 of the carriage is an elongated hydraulic cylinder 36. A piston 38 is movable within the cylinder and a piston rod 40 extends from both sides of the piston outward through opposite ends of the cylinder. The upper end of the piston rod mounts a sprocket 40'. A drive chain 42 is secured at one end by anchor 42' to the beam 22 and extends around sprocket 40', then around drive sprocket 44 and is secured at its opposite end to the upper main frame beam 12 on the outfeed end thereof. Sprocket 44 is mounted on a shaft 46 carried by carriage beam 22.

The bottom end of piston rod 40 mounts a sprocket 40''. One end of a second drive chain 48 is secured by anchor 48' to beam 22 and extends around sprocket 40'', then around sprocket 50 and is secured at its opposite end to the lower main frame beam 12 on the infeed end thereof. Sprocket 50 is mounted on shaft 52 carried by carriage beam 22.

The carriage is stabilized vertically by means of a pair of laterally spaced chains 54. Each chain is secured at its upper end to the upper infeed main frame beam 12, then extends around a sprocket 56 on shaft 46, thence downward and around a sprocket 58 on shaft 52 and then horizontally forward for attachment to the lower outfeed main frame beam 12.

Figure 3:
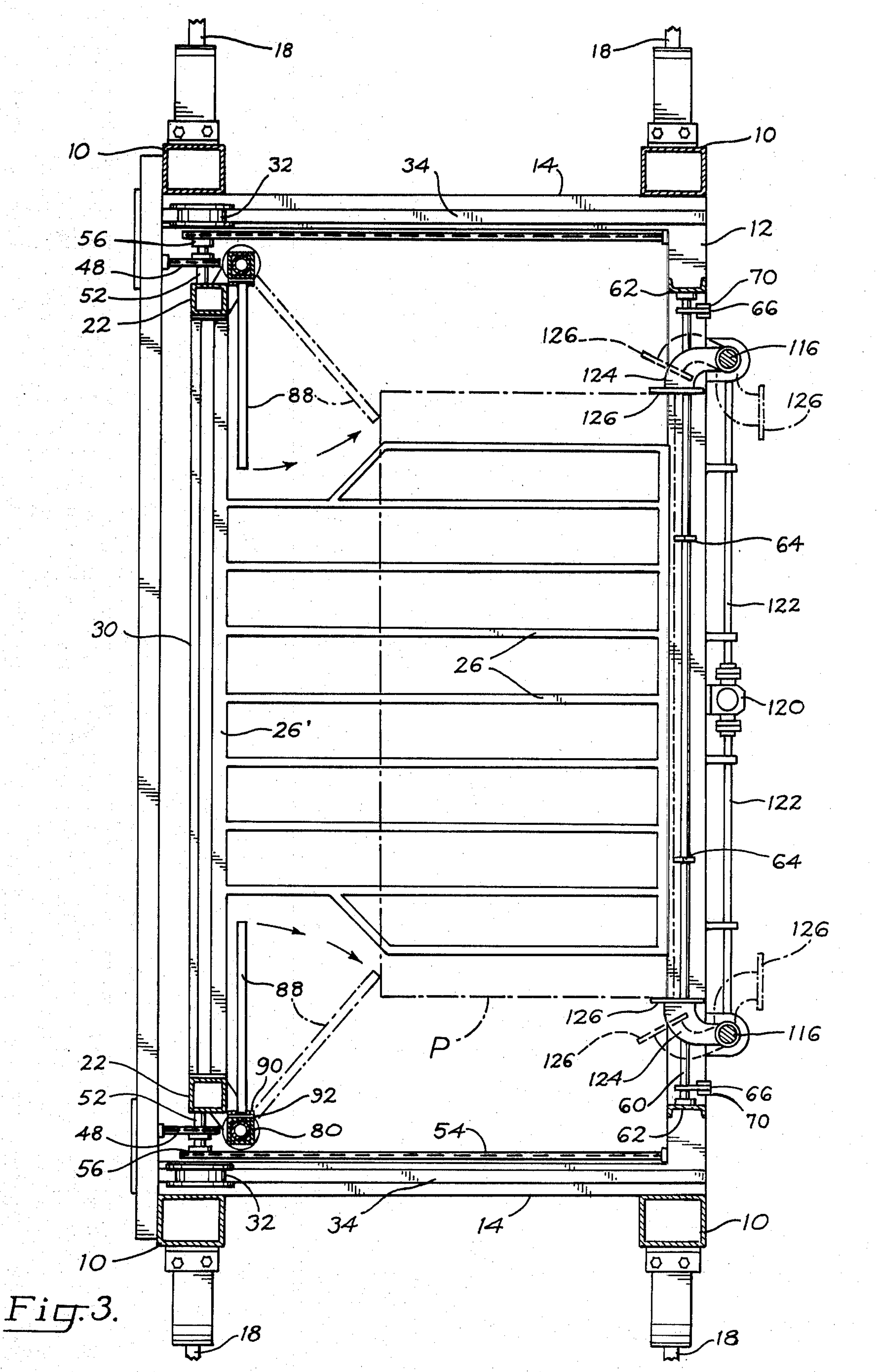
FIG. 3 is a plan view as viewed from the top in FIG. 2.
Figure 4:
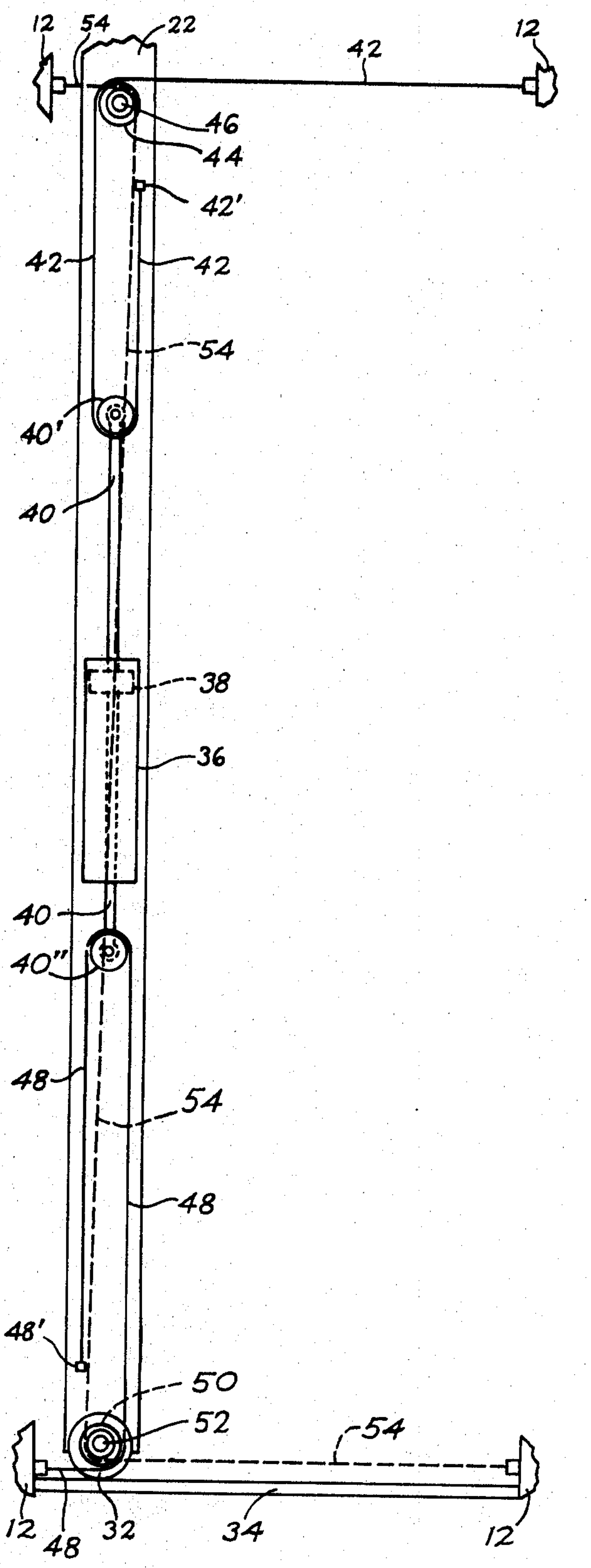
FIG. 4 is a fragmentary side elevation showing in schematic form the drive mechanism for the carriage component of the apparatus, the carriage being shown in the retracted position.
Figure 5:
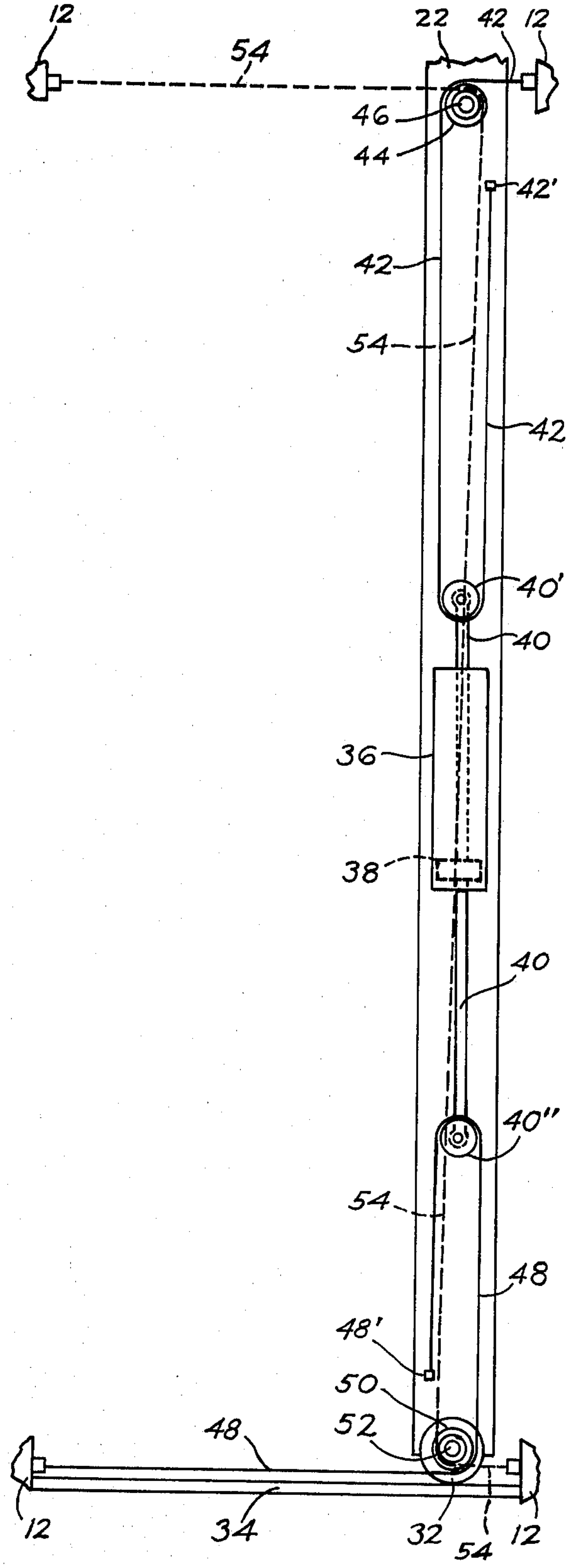
FIG. 5 is a fragmentary side elevation, similar to FIG. 4, showing the carriage drive mechanism with the carriage in the extended position.

FIG. 4 illustrates the carriage in the retracted position of FIGS. 2 and 3. By introducing hydraulic fluid under pressure to the top end of the cylinder 36 at each side of the carriage, the piston and piston rod are driven downward. Accordingly, the upper chains 42 are pulled downward while the lower chains 48 are paid out corresponding, thereby pulling the carriage forwardly, toward the right in FIG. 4, to the extended position illustrated in FIG. 5. The stabilizing chains serve to prevent tilting of the carriage from the vertical position illustrated, by providing counteracting forces at the sprocket shafts 46 and 52.

Although the chains and sprockets are preferred for their positive drive connections, they may be replaced with other forms of flexible lines and pulleys.

Stop mechanism is provided for limiting the forward movement of panels on the trays. In the embodiment illustrated in FIGS. 1-7, the stop mechanism comprises a plurality of transverse rods 60 journaled at their opposite ends in bearings on secondary frame members 62 of the main frame. Each rod is positioned adjacent an associated tray support bar 28. Each rod mounts a plurality of laterally spaced stop fingers 64 which project radially from the rod. Thus, in one position of rotation of each rod the stop fingers project upward in front of the forward end of the associated ray 26 sufficiently to intercept the forward end of a panel deposited on the tray (FIG. 2).

When the rods 60 are rotated 90° clockwise (FIG. 2) the stop fingers 64 are moved to a position below the trays, whereupon the latter may be moved forward, by forward movement of the carriage, to enter the spaces between the platens of the open multi-platen press.

Figures 6, 7, 8, 9, 10, 11:
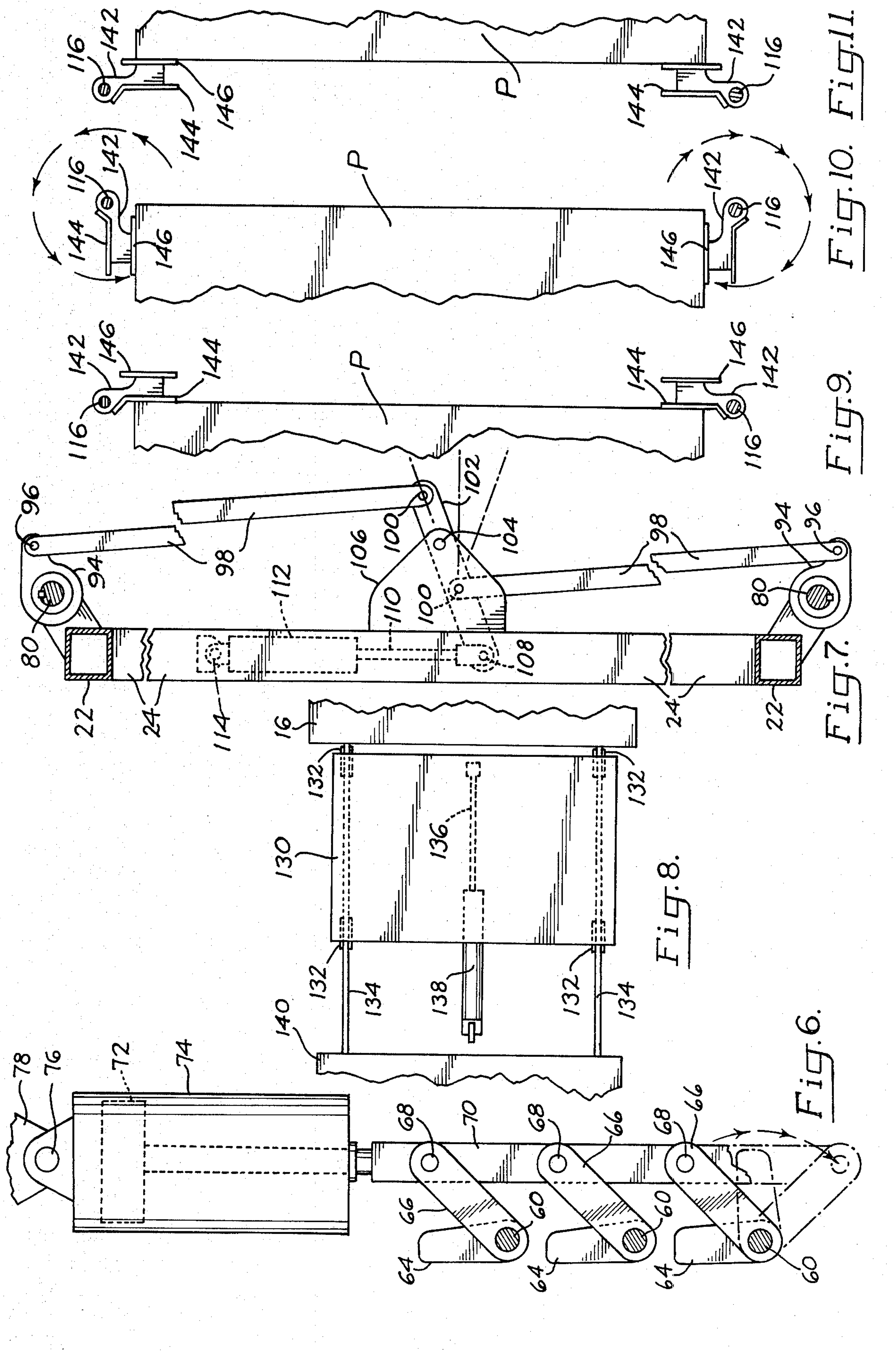
FIG. 6 is a fragmentary side elevation of the alignment stop mechanism of the apparatus.
FIG. 7 is a foreshortened horizontal section of the sweep arm drive mechanism, taken on the line 7—7 in FIG. 2.
FIG. 8 is a fragmentary plan view of a second embodiment of the press loading apparatus.
FIGS. 9, 10 and 11 are fragmentary plan views of panel positioning mechanism of the embodiment shown in FIG. 8, FIG. 9 showing the positioning mechanism adjusted to provide stops for aligning the front and rear sides of panels vertically.

All of the rods 60 are rotated simultaneously between the positions of extension and retraction discussed above. Referring to FIG. 6, this is achieved by connecting each of the rods securely to one end of a link 66 the opposite end of which is connected pivotally, by a pivot shaft 68, to a vertically elongated drive rod 70. The upper end of the drive rod is connected to a piston 72 mounted for reciprocation within an hydraulic cylinder 74. The opposite end of the cylinder is connected pivotally by pivot shaft 76 to a bracket 78 extending downward from the upper main frame beam 12.

Application of hydraulic fluid under pressure to the side of the piston 72 opposite piston rod 70, causes the rod to move downward. The links 66 thus cause rotation of the stop finger rods 60 clockwise through 90°, to move the stop fingers 64 to the retracted position illustrated in broken lines in FIG. 6.

The extended position of the stop fingers functions to provide abutment for the front sides of the panels deposited upon the trays, whereby to align the front and rear sides of the panels vertically.

It is to be noted that the power feeding of the panels onto the trays results in the panels being distributed rather randomly on the trays. Accordingly, it is necessary that the panels be vertically aligned both longitudinally and laterally, in order to assure their proper positioning within the multi-platen press.

Vertical alignment of the panel assemblies in the direction of longitudinal movement toward the press, is achieved by means of the stop fingers 64 and associated pairs of sweep arms. Referring primarily to FIGS. 2, 3 and 7 of the drawings, a pair of vertically elongated pivot posts 80 are mounted one adjacent each of the vertical carriage beams 22. The upper and lower ends of each post are provided in cylindrical form for journaling in bearings 82 for axial and rotational movement. The lower end of each post rests upon the upwardly extending piston rod 84 of an hydraulic cylinder 86 supported by the associated beam 22. Thus, application of hydraulic pressure to the lower end of the cylinder causes upward extension of the piston rod and corresponding upward movement of the associated post.

The posts support a plurality of vertically spaced pairs of elongated sweep arms 88. Each pair is associated with a different one of the trays 26, the arms of each pair being secured one to each of the posts extending and inwardly toward each other. In the preferred embodiment illustrated, the posts are square in cross section and each arm is secured to its post by means of bolts 90 extending through a flange 92 on the arm and secured removably on threaded openings in the post.

As illustrated in broken lines in FIG. 3, the arms of each pair are movable arcuately by limited rotation of the mounting posts. This limited rotation is afforded by the mechanism illustrated in FIG. 7. A lever 94 is keyed to each post in the bottom cylindrical portion thereof to allow vertical movement of the post relative to the lever. The outer end of each lever is connected pivotally, by a pivot shaft 96, to the outer end of an elongated link 98 the inner end of which is connected pivotally, by a pivot shaft 100, to a drive lever 102. The drive lever is pivoted on a pivot shaft 104 located centrally between the pivot shafts 96 and 100 and is supported on a mounting bracket 106 secured to the bottom transverse beam 24 of the carriage.

An extension of the drive lever 102 is connected pivotally, by a pivot shaft 108, to the projecting end of a piston rod 110 extending from one end of an hydraulic drive cylinder 112. The opposite end of the drive cylinder is mounted pivotally on the carriage beam 24 by a pivot shaft 114.

By application of hydraulic fluid under pressure to the piston rod end of the cylinder 112, the piston rod is retracted into the cylinder, thereby causing clockwise rotation of the drive lever 102 about its pivot shaft 104 (FIG. 7). This causes the pairs of sweep arms 88 to move arcuately from the broken line to the solid line positions illustrated in FIG. 3. Application of hydraulic pressure to the cylinder to cause extension of the associated piston rod, causes counterclockwise rotation of the drive lever and consequent arcuate movement of the sweep arms from the solid line to the broken line positions of FIG. 3.

Referring again to FIG. 2 of the drawings, it is to be noted that the sweep arms are in substantial alignment with the guide heads 30 of the trays, leaving sufficient space between each pair of sweep arms and the trays to allow infeed therebetween of panels for deposit on the trays. After such panels have been deposited upon all of the trays from the infeed mechanism previously mentioned, the sweep arm support posts 80 are raised, by applying fluid pressure to extend the piston rods 84 of the supporting cylinders 86 upwardly, to raise the pairs of sweep arms to positions closely adjacent the panel-supporting upper surfaces of the trays. The sweep arm pivot cylinder 112 then is supplied with hydraulic fluid under pressure to cause extension of its piston rod 110 and counterclockwise rotation of the drive lever 102. The pairs of sweep arms thus are caused to swing arcuately from the solid line positions in FIG. 3 to the broken line positions. In so doing, the sweep arms of each pair engage the rearward side of the associated panel P supported on the associated tray 26 and move the panel forward until the front end thereof is brought into positive abutment with the associated stop fingers 64. All of the panels thus are brought to vertical alignment of their front and rear ends.

Means also is provided for bringing the lateral sides of all of the panels into vertical alignment. Referring to FIGS. 2 and 3 of the drawings, a pair of vertically elongated pivot shafts 116 are journaled at their upper and lower ends in bearings 118 secured to the main frame beams 12 adjacent the outfeed end thereof at laterally spaced positions sufficient to allow the panels P to pass between them for transfer to the multi-platen press 16. An hydraulic motor 120 mounted on the lower main frame beam 12 centrally thereof is provided with two rotary outputs connected one to each of the pivot shafts 116 by means of suitable drive shafts 122 and gear couplings (not shown).

The pivot shafts 116 mount a plurality of positioning arms 124 spaced apart vertically in correspondence to the spacings of the trays 26 and arranged in laterally spaced pairs each associated with one of the trays and, correspondingly, one of the spaces between adjacent platens 16 of the open multi-platen press. Each arm supports a flat pad 126 configured to engage an edge of a panel and also to freely enter the space between adjacent platens 16 of a multi-platen press.

The hydraulic motor 120 is arranged to be driven to rotate the pivot shafts 116 through an arc of about 120°, so as to move each positioning arm pad 126 between the broken line positions illustrated in FIG. 3. Thus, the upper arm in FIG. 3 is rotated clockwise from its position projecting forwardly of the main frame to its position extending angularly inward of the main frame, and counterclockwise from the latter position to the full line position in which the pad 126 abuts the lateral side of the panel P carried by the tray. In like manner, the lower positioning arm in FIG. 3 is rotated counterclockwise from the position projecting forwardly of the main frame to the position extending angularly rearward thereof, and then clockwise to the full line position in which it abuts the confronting side of the panel P. This latter movement of all of the pairs of positioning arms moves all of the panels on the trays into vertical alignment of their lateral sides.

All of the panels thus have been brought into vertical alignment of all of their four sides, whereupon the panels are in proper position for transfer into the multi-platen press 16. This is achieved by retracting the positioning arms laterally outward of the full line position illustrated in FIG. 3, thereby releasing their engagement with the sides of the panel, and then activating the carriage drive cylinders 36 to move the carriage in the outfeed direction of the main frame. During this forward movement of the carriage, the sweep arms 88 are retained in the broken line positions of FIG. 3, in positive contact with the rearward ends of the panels P. Since the sweep arms are mounted on the carriage and move with it, they provide positive confinement of the panels on the trays and thus positive feed into the press. Accordingly, if any portion of a panel should engage a portion of the press platens during transfer to the press, the positive abutment of the sweep arms against the rearward end of the panels insures that the latter nevertheless will be forced into the press opening and brought to proper position with the press.

When the carriage has moved to its forward position, with the trays and the supported panels extended into the open press, the positioning arms 124 are rotated to the broken line position of FIG. 3 forwardly of the main frame. In this position the positioning arm pads 126 are located slightly inward of the infeed sides of the press platen, as illustrated in FIG. 2. They closely overlie the associated tray and provide an intercepting abutment for the rear sides of the panels supported on the trays. The carriage is now driven in the retracting direction for return to the position illustrated in FIGS. 2, 3, and 4.

During this retraction the rearward sides of the panels are brought into abutment with the positioning arm pads and thus are retained in proper position within the platen press as the trays are moved out from under them.

The panels having thus been stripped from the trays and the trays removed from the press, the press now may be closed to effect the pressing operation. During the pressing cycle, the loader described hereinbefore may once again be filled with panels in the manner previously described. When the pressing cycle is completed, the press is opened and the loader carriage moved forward to transfer the aligned panels into the press. During this transfer the front ends of the trays abut the previously pressed panels within the press and push them from the outfeed end of the press simultaneously as the new group of panels is transferred into the press for pressing.

As previously mentioned, and as illustrated in FIG. 2 of the drawings, the press loader apparatus is located closely adjacent the infeed side of the multi-platen press. The positioning arms 124 thus cannot be rotated through 360° of rotation of their mounting shafts 116. Rather, the positioning arms are limited to the approximately 120° of arcuately reciprocation described hereinbefore. Further, the main frame is mounted by the rail wheels 20 and rails 18 for movement transversely of the multi-platen press 16 in order to gain access to the components of the loading apparatus for maintenance and repair.

Referring now to the embodiment illustrated in FIG. 8, the main frame 130 of the loading apparatus is supported by rail wheels 132 on rails 134 for movement toward and away from the infeed end of the multi-platen press 16. This movement of the main frame is afforded by an hydraulic piston-cylinder unit. As illustrated, the projecting end of the piston rod 136 is connected pivotally to the main frame adjacent the outfeed end thereof and the end of the cylinder 138 opposite the piston rod is connected pivotally to the supporting floor. The main frame is moved to the retracted position away from the press and closely adjacent the infeed mechanism 140 by applying hydraulic fluid under pressure to the piston rod end of the cylinder, to effect retraction of the piston rod. After the panels have been loaded onto the trays 26, the main frame is moved forward to the position illustrated in FIG. 8, where its outfeed end is closely adjacent the multi-platen press 16, for transfer of the panels to the press.

Since the main frame of the embodiment illustrated in FIG. 8 is retractable from the multi-platen press, for example to a distance of 30 inches or so, it is convenient to utilize a modified form of panel stop and positioning arm mechanism. Such a modified arrangement is illustrated in FIGS. 9, 10 and 11. In this arrangement the assembly of stop fingers 64 and associated pivot rods 60 and drive linkage is eliminated, and the positioning arms 126 of the previously described embodiment are replaced with positioning arms 142 each provided with two panel abutment pads 144 and 146. Moreover, the supporting pivot shafts 116 are allowed to rotate through 360°, since rotation of the positioning arms can be achieved after the main frame 130 has been retracted from the press.

FIG. 9 illustrates the disposition of the positioning arms 142 with one of the abutment pads 144 of the pair of arms positioned for abutment by the front end of a panel P supported on the associated tray. These abutment surfaces of the positioning arms perform the same function as the stop fingers 64 of the previous embodiment, and they cooperate with the sweep arms 88 to bring the front and rear sides of the panels into vertical alignment.

After the panels have been aligned by the sweep arms 88 and stop pads 144, the positioning arms 142 are rotated in the direction of the arrows in FIG. 10 to bring the other pads 146 of the arms into abutment with the lateral sides of the panels to align the lateral sides of the panels vertically. The positioning arms then are retracted slightly to release the panels for transfer into the open multi-platen press 16. The positioning arms then are rotated to the position illustrated in FIG. 11 where the same positioning arm pads 146 serve to strip the panels from the trays as the latter are retracted from the press, leaving the panels properly positioned within the press for subsequent pressing.

It will be appreciated that access to the components of the loading apparatus illustrated in FIG. 8 is facilitated by moving the main frame 130 to a retracted position removed from the infeed side of the platen press 16. This arrangement avoids the requirement in the first embodiment described of providing sufficient space to one side of the loading apparatus into which the latter may be moved for maintenance and repair.

It is to be noted that both of the embodiments illustrated and described provide for the vertical alignment of a plurality of panels both longitudinally and laterally, without any movement of the carriage and tray mechanism. Such alignment is accomplished simply by the pivotal movement of a few shafts which require a minimum of power for their operation. This portion of the loading cycle thus is achieved with maximum speed and with minimum power requirement. Thereafter, transfer of the aligned panels into the press is achieved by the simple movement of the carriage in one direction only, again with maximum speed and minimum power. Moreover, the transfer of the panels to the press is conducted under conditions of positive confinement of the panels against displacement on the trays, to insure that the panels are brought into the press and deposited in proper and uniform position. This is achieved by maintaining the sweep arms 88 in positive contact with the rearward sides of the panels during forward movement of the carriage and insertion of the trays and panels into the press.

It is to be noted further that two or more panels may be mounted on each tray 26 and that all of such panels will be aligned vertically both longitudinally and laterally by operation of the sweep arms and stop fingers and positioning arms. These aligned panels also will be transferred into the multi-platen press under positive confinement by the sweep arms moving with the carriage.

It will be further apparent to those skilled in the art that various changes may be made in the size, shape, type, number and arrangement of parts described hereinbefore without departing from the spirit of this invention and the scope of the appended claims.

Having now described my invention and the manner in which it may be used, I claim:

1. The method of loading a plurality of panels into a multi-platen press, comprising:

(a) infeeding a panel onto each of a plurality of vertically spaced trays mounted for movement with a carriage,
(b) while retaining the carriage in stationary position, pushing the panels forwardly on the trays into abutment with vertically aligned stops extended in front of the trays, whereby to align the forward ends of the panels vertically,
retracting the stops away from the panels,
(d) while holding the panels against rearward movement on the trays, moving the carriage forwardly to move the trays and panels into the spaces between platens of the open multi-platen press, and
(e) while holding the panels against rearward movement relative to the press, retracting the carriage and withdrawing the trays from the press, thereby depositing the panels on the press platens.

2. The method of claim 1 including the step, following aligning the forward ends of the panels vertically and while retaining the carriage in stationary position, of moving the panels laterally on the trays to align the sides of the panels vertically.

3. Apparatus for loading a plurality of panels into a multi-platen press, comprising:
(a) a main frame located on the infeed side of the multi-platen press and having a panel outfeed end facing said infeed side of the press,
(b) a carriage mounted on the main frame for movement toward and away from the outfeed end of the main frame,
(c) a plurality of vertically spaced panel support trays mounted on the carriage for movement therewith for retractable extension forwardly of the outfeed end of the main frame for insertion into and retraction from the spaces between the press platens when the press is open,
(d) stop means mounted on the main frame adjacent the outfeed end thereof for movement between an extended position for intercepting the forward ends of panels supported on the trays and the retracted position displaced from panels on the trays,
(e) sweep arm means mounted on the carriage for movement therewith and for movement relative thereto between a retracted position displaced from the trays for receiving panels onto the trays and an extended position for abutment with the rearward ends of the panels on the trays for moving the panels forwardly into abutment with the forward ends with the extended stop means for aligning the forward ends of the panels vertically, the sweep arm means being movable with the carriage for moving the vertically aligned panels into the press when the stop means are retracted, and
(f) panel stripper means mounted movably on the main frame for releasably engaging panels on the trays within the press for retaining the panels in the press while the trays are retracted from the press.

4. The apparatus of claim 3 wherein the panel stripper means also is movable to a panel aligning position abutting the lateral sides of panels on the trays for aligning the lateral sides of the panels vertically.

5. The apparatus of claim 3 wherein the stop means comprise a plurality of finger members mounted on a plurality of rods extending transversely across the main frame adjacent the outfeed end thereof, the rods being rotatable for moving the finger members between said extended and retracted positions.

6. The apparatus of claim 5 including power means interconnecting the rods for rotating them in unison.

7. The apparatus of claim 3 including support means supporting the stop means and the stripper means and mounted on the main frame for moving the stop means and the stripper means.

8. The apparatus of claim 7 including power means on the main frame engaging the support means for moving the stop means and the stripper means.

9. The apparatus of claim 3 wherein the sweep arm means comprise a pair of laterally spaced elongated arms mounted on the carriage adjacent the opposite sides of each tray and movable vertically relative to the tray between a retracted position displaced from the tray for infeeding a panel onto the tray and an extended position in the plane of a panel on the tray for engaging the rearward end of a panel on the tray, the arms of each pair also being movable horizontally toward the forward end of the tray for moving a panel forwardly into abutment with the stop means.

10. The apparatus of claim 9 including a pair of laterally spaced sweep arm support posts mounted vertically on the carriage adjacent the rearward ends of the trays for axial and rotational movement.

11. The apparatus of claim 10 including power means on the carriage engaging the sweep arm support posts for moving the latter axially and rotationally.

12. The apparatus of claim 3 including carriage drive means comprising:
(a) a fluid pressure cylinder secured to the carriage,
(b) a piston rod extending from both ends of the cylinder,
(c) first flexible line means interconnecting one end of piston rod and the rearward end of the main frame, and
(d) second flexible line means interconnecting the other end of the piston rod and the forward end of the main frame.

13. The apparatus of claim 12 wherein the first and second line means extend around pulley members one adjacent the upper end of the carriage and the other adjacent the lower end of the carriage, and stabilizer line means extends around pulley members adjacent the first and second line pulley members and is secured at its opposite ends to the forward and rearward ends of the main frame in opposition to the first and second line means.

* * * * *